US007133563B2

(12) United States Patent
Wang et al.

(10) Patent No.: US 7,133,563 B2
(45) Date of Patent: Nov. 7, 2006

(54) PASSIVE EMBEDDED INTERACTION CODE

(75) Inventors: Jian Wang, Beijing (CN); Yingnong Dang, Beijing (CN); Jiang Wu, Beijing (CN); Xiaoxu Ma, Beijing (CN)

(73) Assignee: Microsoft Corporation, Redmond, WA (US)

( * ) Notice: Subject to any disclaimer, the term of this patent is extended or adjusted under 35 U.S.C. 154(b) by 741 days.

(21) Appl. No.: 10/284,451

(22) Filed: Oct. 31, 2002

(65) Prior Publication Data

US 2004/0086191 A1   May 6, 2004

(51) Int. Cl.
*G06K 9/36* (2006.01)
*G06K 9/46* (2006.01)
*G06K 9/20* (2006.01)

(52) U.S. Cl. .................. 382/240; 382/232; 382/312

(58) Field of Classification Search ........ 382/187–188, 382/232, 251, 253, 312, 240; 345/179
See application file for complete search history.

(56) References Cited

U.S. PATENT DOCUMENTS

| | | | |
|---|---|---|---|
| 4,742,558 A | 5/1988 | Ishibashi et al. |
| 4,745,269 A | 5/1988 | Van Giles et al. |
| 5,073,966 A | 12/1991 | Sato |
| 5,247,137 A | 9/1993 | Epperson |
| 5,288,986 A | 2/1994 | Pine et al. |
| 5,294,792 A | 3/1994 | Lewis et al. |
| 5,448,372 A | 9/1995 | Axman et al. |
| 5,587,558 A | 12/1996 | Matsushima |
| 5,612,524 A | 3/1997 | Saint Anselmo et al. |
| 5,644,652 A | 7/1997 | Bellegarda et al. |
| 5,661,506 A | 8/1997 | Lazzouni et al. |
| 5,686,718 A | 11/1997 | Iwai et al. |
| 5,726,435 A | 3/1998 | Hara et al. |
| 5,817,992 A | 10/1998 | Antonio |
| 5,822,465 A | 10/1998 | Normile et al. |
| 5,855,483 A | 1/1999 | Collins et al. |
| 5,898,166 A | 4/1999 | Fukuda et al. |
| 5,902,968 A | 5/1999 | Sato et al. |
| 5,960,124 A | 9/1999 | Taguchi et al. |
| 6,005,973 A | 12/1999 | Seybold et al. |
| 6,044,165 A | 3/2000 | Perona et al. |
| 6,052,481 A | 4/2000 | Grajski et al. |
| 6,081,261 A | 6/2000 | Wolff et al. |
| 6,141,014 A | 10/2000 | Endo et al. |
| 6,226,636 B1 | 5/2001 | Mohamed et al. |
| 6,243,071 B1 | 6/2001 | Shwarts et al. |

(Continued)

FOREIGN PATENT DOCUMENTS

EP   0 407 734   1/1991

(Continued)

OTHER PUBLICATIONS

Dey, et al., "A Fast Algorithm for Computing the Euler Number of an Image and its VLSI Implementation", IEEE; 13th International Conference on VSLI Design (Jan. 2003).

(Continued)

*Primary Examiner*—Duy M. Dang
(74) *Attorney, Agent, or Firm*—Banner & Witcoff, Ltd.

(57) ABSTRACT

A system and method for encoding a document image and finding a location based on that image are described. A document page is encoded into codes associated with various locations of the document page. The codes are assembled into a code book. Captured images may then be similarly encoded and searched against the codes in the codebook. One or more codes and associated locations may be returned, thereby providing one or more possible locations for the captured images.

12 Claims, 8 Drawing Sheets

U.S. PATENT DOCUMENTS

| | | |
|---|---|---|
| 6,278,968 B1 | 8/2001 | Franz et al. |
| 6,479,768 B1 | 11/2002 | How |
| 6,577,299 B1 | 6/2003 | Schiller et al. |
| 6,585,154 B1 | 7/2003 | Ostrover et al. |
| 6,744,967 B1 | 6/2004 | Kaminski et al. |
| 6,752,317 B1 | 6/2004 | Dymetman et al. |
| 6,870,966 B1 * | 3/2005 | Silverbrook et al. ........ 382/313 |
| 2001/0023896 A1 | 9/2001 | Duanfeng et al. |
| 2001/0038711 A1 | 11/2001 | Williams |
| 2002/0020750 A1 | 2/2002 | Dymetman et al. |
| 2002/0148655 A1 | 10/2002 | Cho et al. |
| 2002/0163510 A1 | 11/2002 | Williams et al. |
| 2002/0163511 A1 | 11/2002 | Sekendur |
| 2003/0063045 A1 | 4/2003 | Fleming |
| 2003/0063072 A1 | 4/2003 | Brandenberg et al. |
| 2004/0032393 A1 | 2/2004 | Brandenberg et al. |

FOREIGN PATENT DOCUMENTS

| | | |
|---|---|---|
| EP | 0564708 A | 10/1993 |
| EP | 0694870 A | 1/1996 |
| EP | 0 732 666 | 9/1996 |
| EP | 0 865 166 | 9/1998 |
| EP | 1 158 456 | 11/2001 |
| WO | WO 96/30217 | 10/1996 |
| WO | WO 00/25293 | 5/2000 |
| WO | WO 01/48685 | 7/2001 |
| WO | WO 01/71654 | 9/2001 |
| WO | WO 02/077870 | 10/2002 |

OTHER PUBLICATIONS

European Search Report, Application No.: 03021238.5-1527; Dated Jun. 1, 2005, Total Pages (6).

Fujieda et al., "*Development Of Pen-Shaped Scanners*", Nec, vol. 51, No. 10, 1998.

Crowley et al., "*Things That See*", Communications of the A.C.M., vol. 43, No. 3, pp. 54-64, Mar. 2000.

Sato et al., "*Video Tablet—2D Coordinate Input Device With OCD Camera*", Osaka University, vol. J67-D, No. 6, Jun. 1984.

Okada et al., "*A High-Resolution Handwriting Character Input Device Using Laser Beams*", Department of Instrumentation Engineering, Faculty of Science and Technology, vol. 10.4, No. 11.1, 1981.

Ko et al., "*Finger Mouse and Gesture Recognition System As A new Human computer Interface*", Computer and Graphics, col. 21, No. 5, pp. 555-561, 1997.

Champaneria, "*PADCAM: A Real-Time, Human-Centric Notetaking System*", MIT Laboratory for Computer Science, Mar. 2002.

OTM Technologies, "*VPEN—Revolutionizing Human Interaction With The Digital World™*", pp. 1-6.

Internet Print Out: "*N-Scribe For Digital Writing*", Mobileinfo.com, News issue #2001—15 (Apr. 2001), http://www.mobileinfo.com/News_2001/Issue15/Digital-nscribe.htm, dated Jul. 15, 2002.

Internet Print Out: "*Don't Break This Ink Pen*", Edgereview.com, by Brian Urbanski, http://www.edgereview.com/ataglance.cfm?category=edge&ID=180, dated Jul. 15, 2002.

Internet Print Out: "*DataGlyphs® : Embedding Digital Data*", Parc Solutions, http://www.parc.com/solutions/dataglyphs/, dated Jul. 15, 2002.

Internet Print Out: "*Navilite—Optical Opportunities—Bluetooth-enabled optical transition measurement technology paves the way for an untethered stylus that can write on any surface*", vol. 8, Issue No. 34, Jul. 5-11, 2002, www.computerworld.com, dated Aug. 15, 2002.

Internet Print Out: "*Competitive Technologies' Investee Introduces N-Scribe Pen—Digital Ink Presents Wireless Pen At Demo 2001*", Competitive Technologies, http://www.competitivetech, dated Sep. 5, 2003.

Internet Print Out: "N-Scribe For Digital Writing", Flash Commerce News, http://flashcommerce.com/articles/, dated Sep. 5, 2003.

Internet Print Out: "*The Hot New Medium: Paper—How The Oldest Interface In The Book Is Redrawing The Map Of The Networked World*", http://www.wired.com/wired/, dated Sep. 5, 2003.

Internet Print Out: "*Maxell Digital Pen To Use Anoto System*", Gizmo, http://www.gizmo.com.au/, dated Sep. 5, 2003.

Internet Print Out: "*Anoto Pen Bluetooth*", Tabletpccorner, http://www.tabletpccorner.net, dated Sep. 5, 2003.

Internet Print Out: "*Jot This—Nscribe Pen*", PC Magazine, http://www.pcmag.com/article2/0,4149,31650,00.asp, dated Jul. 15, 2002.

Internet Print Out: "*Jot This—Nscribe Pen*", PC Magazine, http://www.pcmag.com/article2/0,4149,31650,00.asp, dated Sep. 5, 2003.

Internet Print Out: "*RF Pen Sends Your Scribbles*", Appliance Manufacturing Magazine, http://www.ammagazine.com. Dated Sep. 26, 2002.

Internet Print Out: "Nscribe pen And Presenter-To-Go—Infrared Pen And New Springboard Module Make Their Debut At Demo 2001", Edgereview.com, by Brian Urbanski, http://www.techtv.com/freshgear/pr, dated Sep. 5, 2003.

Internet Print Out: "*Don't Break This Ink Pen*", Edgereview.com, by Brian Urbanski, http://www.edgereview.com/ataglance.cfm?category=edge&ID=180, dated Sep. 5, 2003.

Internet Print Out: "*Preprocessing In the NPen++ System*", http://www.is.cs.cmu.edu/mie/multimodal_npen_preproc.html, dated Aug. 8, 2002.

Internet Print Out: "*OTM Technologies—V Pen*", searched http://www.otmtech.com/vpen3.asp, pp. 1-7.

Internet Print Out: "*Mimio—Products*", Mimio, http://www.mimio.com, pp. 1-8.

Internet Print Out: "*SMART Board Interactive Whiteboard*", Smarttech, http://www.smarttech.com, pp. 1-26.

Haynes, "*Wacom PL-500*", www.wacom.co.uk.

Internet Print Out: "(*Electro-Magnetic Resonance*) *send and position sensing technology*" Wacom, Technology, http://www.wacom-components.com/tech.asp, pp. 1-6.

Internet Print Out: "*Cordless Batteryless Pen*", Wacom Penabled, Components, http://www.wacom.com/components/index.cfm, dated Jul. 15, 2002.

Internet Print Out: "*PL-500—15.1 inch Screen Digital LCD Pen Tablet System*", Wacom Graphics Tablet Solution, http://ap.wacm.co.jp/products/pl/contents/pl500.html, pp. 1-13.

Internet Print Out: Digital Pens, http://www.anotofunctionality.com/navigate.asp?PageID=96, pp. 1-70.

Dumer et al., "Hardness of Approximating the Minimum Distance of a Linear Code", IEEE, pp. 475-484, 1999.

Clark et al., "Maximal and Near-Maximal Shift Register Sequences: Efficient Event Counters and Easy Discrete Logarithms", IEEE Transactions on Computers, vol. 43, No. 5, May 1994.

Grasso et al., "Augmenting Recommender Systems by Embedding Interfaces into Practices", pp. 267-275, 1999.

Moran et al., "Design and Technology for Collaborage: Collaborative Collages of Information on Physical Walls", Nov. 1999.

Kai-Fu Lee, "Automatic Speech Recognition—The Development of the Sphinx System", Kluwer Academic Publishers, pp. 1-207, 1992.

Frederick Jelinek, "Statiscal Methods for Speech Recognition", The MIT Press, pp. 1-283, 2001.

Lau, R., "Adaptative Statistical Language Modeling", Submitted to the Dept. of Electrical Engineering and Computer Science in Partial Fulfillment for the Degree of Master of Science at the MIT, May 1994.

European Office Action dated Mar. 10, 2006 from European Patent Application No. 03021238.5-1527.

Search Report dated Jun. 1, 2005 from European Patent Application No. 03021224.5.

\* cited by examiner

PASSIVE EMBEDDED INTERACTION CODE

TECHNICAL FIELD

The present invention relates to interacting with paper using a digital pen. More particularly, the present invention relates to determining the location of annotations made on paper by a digital pen.

BACKGROUND

Computer users are accustomed to using a mouse and keyboard as a way of interacting with a personal computer. While personal computers provide a number of advantages over written documents, most users continue to perform certain functions using printed paper. Some of these functions include reading and annotating written documents. In the case of annotations, the printed document assumes a greater significance because of the annotations placed on it by the user. One of the difficulties, however, with having a printed document with annotations is the later need to have the annotations entered back into the electronic form of the document. This requires the original user or another user to wade through the annotations and enter them into a personal computer. In some cases, a user will scan in the annotations and the original text, thereby creating a new document. These multiple steps make the interaction between the printed document and the electronic version of the document difficult to handle on a repeated basis. Further, scanned-in images are frequently non-modifiable. There may be no way to separate the annotations from the original text. This makes using the annotations difficult. Accordingly, an improved way of handling annotations is needed.

SUMMARY

Aspects of the present invention provide solutions to at least one of the issues mentioned above, thereby enabling one to locate a position or positions on a viewed image. Knowledge of these positions permit a user to write annotations on a physical document and have those annotations associated with an electronic version of the physical document. Some aspects of the invention relate to the various techniques used to encode the physical document. Other aspects relate to the organization of the encoded document in searchable form.

These and other aspects of the present invention will become known through the following drawings and associated description.

BRIEF DESCRIPTION OF DRAWINGS

The foregoing summary of the invention, as well as the following detailed description of preferred embodiments, is better understood when read in conjunction with the accompanying drawings, which are included by way of example, and not by way of limitation with regard to the claimed invention.

DETAILED DESCRIPTION

Aspects of the present invention relate to determining the location of a captured image in relation to a larger image. The location determination method and system described herein may be used in combination with a multi-function pen. This multifunction pen provides the ability to capture handwritten annotations that are made on a fixed document, then having the annotations locatable with the information on the fixed document. The fixed document may be a printed document or may be a document rendered on a computer screen.

The following is arranged into a number of subsections to assist the reader in understanding the various aspects of the invention. The subsections include: terms, general purpose computer; locating captured image; encoding; codebook generation; and candidate search.

Terms

Pen—any writing implement that may or may not include the ability to store ink. In some examples a stylus with no ink capability may be used as a pen in accordance with embodiments of the present invention.

Camera—an image capture system.

Encoding—a process by taking an image (either scanned in from a physical paper form or rendered from an electronic form) or from a camera and modifying it in some way.

Codebook—a storage that stores an encoded image or encoded sub-images.

General Purpose Computer

Figure 1:
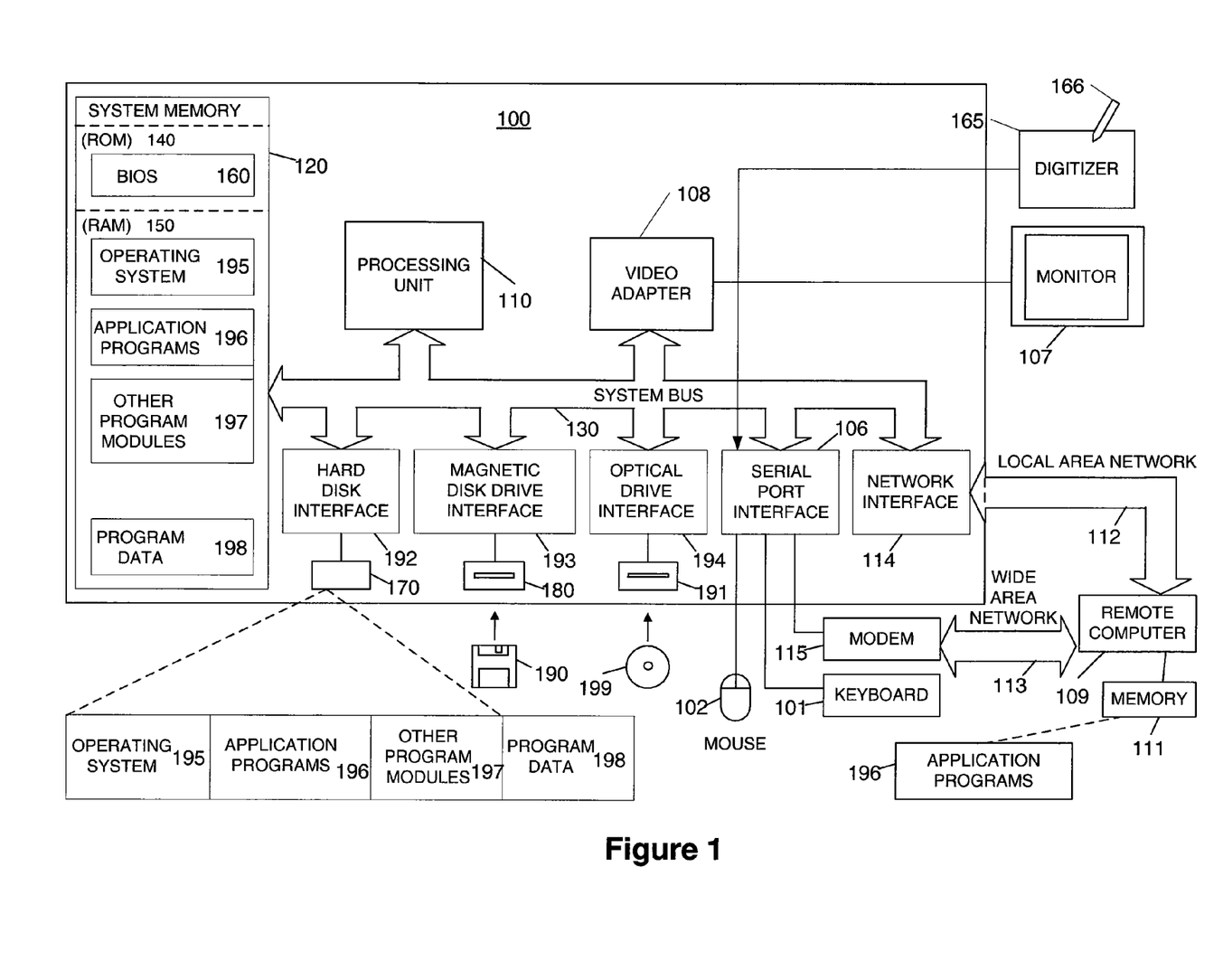
FIG. 1 shows a general description of a computer that may be used in conjunction with embodiments of the present invention.

FIG. 1 is a functional block diagram of an example of a conventional general-purpose digital computing environment that can be used to implement various aspects of the present invention. In FIG. 1, a computer 100 includes a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory 120 includes read only memory (ROM) 140 and random access memory (RAM) 150.

A basic input/output system 160 (BIOS), containing the basic routines that help to transfer information between elements within the computer 100, such as during start-up, is stored in the ROM 140. The computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 199 such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules and other data for the personal computer 100. It will be appreciated by those skilled in the art that other types of computer readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 170, magnetic disk 190, optical disk 199, ROM 140 or RAM 150, including an operating system 195, one or more application programs 196, other program modules 197, and program data 198. A user can enter commands and information into the computer 100 through input devices such as a keyboard 101 and pointing device 102. Other input devices (not shown) may include a microphone, joystick, game pad, satellite dish, scanner or the like. These and other input devices are often connected to the processing unit 110 through a serial port interface 106 that is coupled to the system bus, but may be connected by other interfaces, such as a parallel port, game port or a universal serial bus (USB). Further still, these devices may be coupled directly to the system bus 130 via an appropriate interface (not shown). A monitor 107 or other type of display device is also connected to the system bus 130 via an interface, such as a video adapter 108. In addition to the monitor, personal computers typically include other peripheral output devices (not shown), such as speakers and printers. In a preferred embodiment, a pen digitizer 165 and accompanying pen or stylus 166 are provided in order to digitally capture freehand input. Although a direct connection between the pen digitizer 165 and the serial port is shown, in practice, the pen digitizer 165 may be coupled to the processing unit 110 directly, via a parallel port or other interface and the system bus 130 as known in the art. Furthermore, although the digitizer 165 is shown apart from the monitor 107, it is preferred that the usable input area of the digitizer 165 be co-extensive with the display area of the monitor 107. Further still, the digitizer 165 may be integrated in the monitor 107, or may exist as a separate device overlaying or otherwise appended to the monitor 107.

The computer 100 can operate in a networked environment using logical connections to one or more remote computers, such as a remote computer 109. The remote computer 109 can be a server, a router, a network PC, a peer device or other common network node, and typically includes many or all of the elements described above relative to the computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, the computer 100 is connected to the local network 112 through a network interface or adapter 114. When used in a WAN networking environment, the personal computer 100 typically includes a modem 115 or other means for establishing a communications over the wide area network 113, such as the Internet. The modem 115, which may be internal or external, is connected to the system bus 130 via the serial port interface 106. In a networked environment, program modules depicted relative to the personal computer 100, or portions thereof, may be stored in the remote memory storage device.

It will be appreciated that the network connections shown are illustrative and other techniques for establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Locating Captured Image

Aspects of the present invention include storing and encoded version of a document in a searchable form. When an annotating device (for example, a pen with a camera attached for capturing a sub-image of a document) is used to write annotations, the system permits a determination of the location of the camera. This determination of the location of the camera may be used to determine the location of where the annotation is located. In some aspects of the present invention, the pen may be an ink and writing on paper. In other aspects, the pen may be a stylus with the user writing on the surface of a computer display. In this latter example, the annotations written on the computer screen may be provided back to the system supporting the document displayed on the computer screen. By repeatedly capturing the location of the camera, the system can track movement of the stylus being controlled by the user.

To determine location of a captured image, three processes may be used. In practice, however, aspects of these three processes may be combined into less than three processes or separated into more than three processes. The first process relates to encoding the image into a searchable form. In one example, the image is encoded into a searchable form and associated with a location of the image (for example, the center coordinates of the image). The location of the center of a captured image may be in any position of the document image. Any sub-image (with a center in any position of the document image) may be encoded. This provides the benefit that the various positions of the document image may be encoded so that any possible position (at which the captured image can be located) is stored in a codebook and may be searched.

The second process relates to compiling the encoded image or sub-image into a searchable structure. The third process relates to searching the encoded sets of information to determine a location of a camera's image with respect to the original document. Subsequent processing may then be used to determine the location of a stylus pen tip in relation to the image from the camera.

Figure 2:
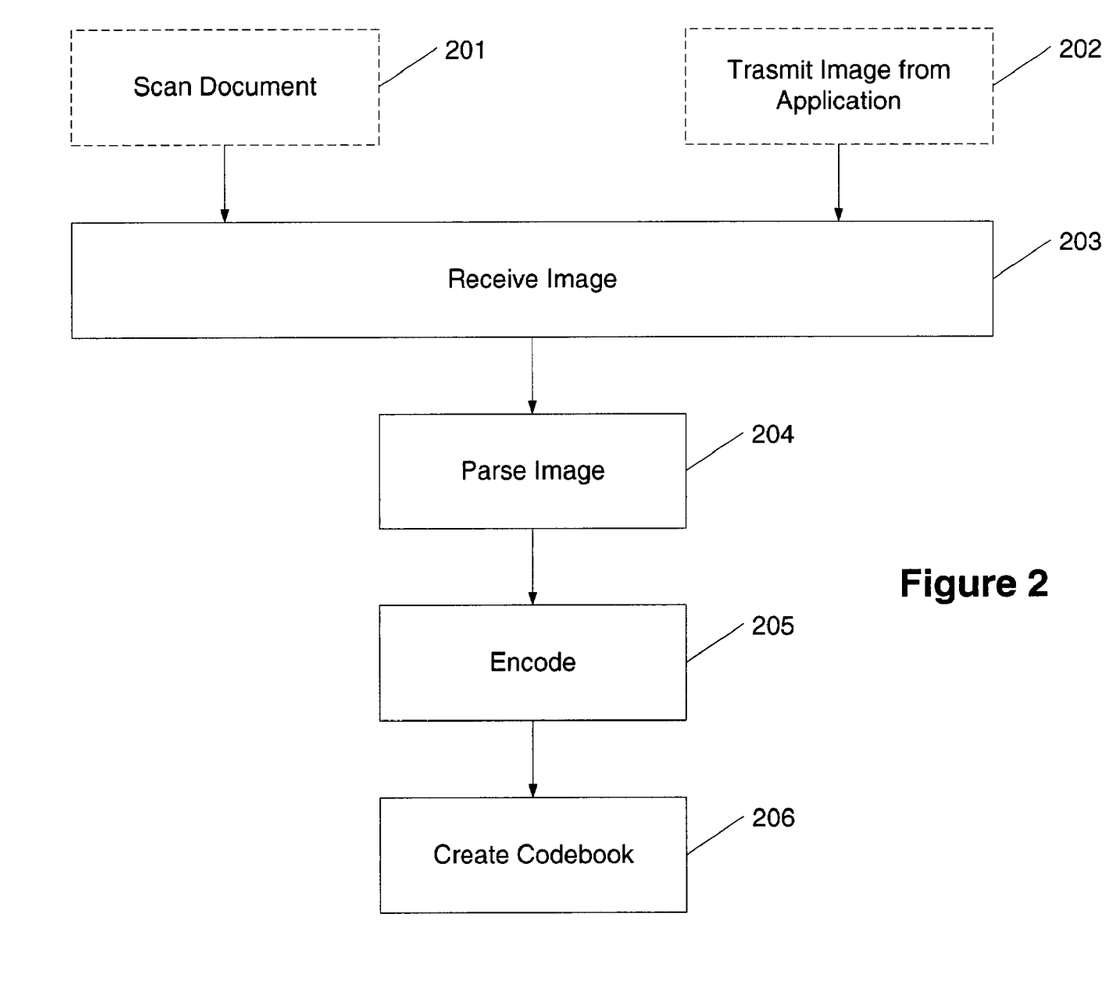
FIG. 2 shows a process for parsing the received image and creating a codebook in accordance with embodiments present invention.

Referring to FIG. 2, an image of a document is received in step 203. The image of the document received in step 203 may result from the scan of a paper document in step 201. Alternatively, the image of step 203 may originate from an application in step 202.

In step 204, the image is parsed into sub-images. In step 205, the sub-images are converted into a searchable form with their corresponding location attached, namely, some position-code pairs are obtained. Accordingly, each location with integer pixel units has a corresponding code. In step 206, the encoded datasets with position-code pairs from step 205 are arranged in a searchable codebook, which is indexed with the property of codes.

Figure 3:
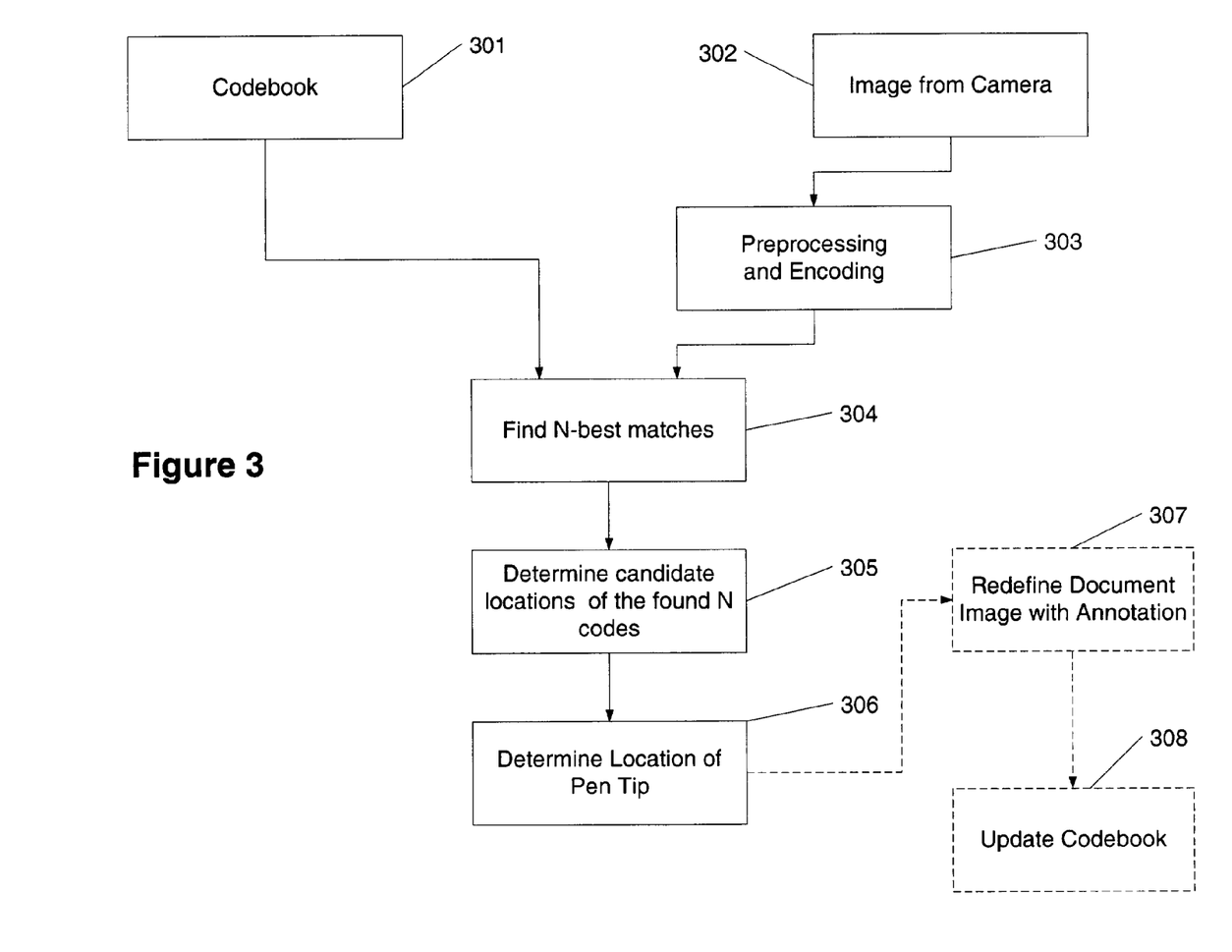
FIG. 3 shows a process for determining one or more possible locations of an image from a camera in accordance with embodiments of the present invention.

Referring to FIG. 3, a codebook is searched for an image corresponding to one from the camera. The image from the camera may be approximately the size of the sub-images from a larger image. Making the sub-images approximately the same size of the image from the camera permits faster searching. Otherwise, scaling the camera to the sub-image size, scaling the sub-image to a camera image size, or some combination of both types of scaling may be used to compare the images. In step 304, an image from a camera from step 302 is compared with datasets from the codebook 301. The comparison step of 304 may include finding the N best codes that exceed a threshold between the codebook data 301 and the captured images 302. The image from camera in step 302 may be used directly in step 304 or may undergo preprocessing and encoding in step 303. The preprocessing of step 303 may include converting grayscale images into binary, black and white images. The preprocessing may account for rotation, skewing, white level balance, quantization error, perspective correction and the like. The encoding of step 303 means applying similar processing as step 205 to the image from the camera (step 302).

Next, in step 305, the location candidates of the found N codes (exceeding the threshold) are determined. The code obtained from step 303 is compared with the codes in the codebook, and the codes best matched with the code from step 303 are kept. From the location of the image as determined in step 305, the location of the pen tip is determined in step 306. Optionally, as shown in broken boxes, new annotations may be processed in step 307 and the codebook updated in step 308. The process of adding back the annotations may improve the ability of the system to locate a camera frame when the user is writing on or near preexisting annotations.

This determination of the location of a captured image may be used to determine the location of a user's interaction with the paper, medium, or display screen. In some aspects of the present invention, the pen may be an ink pen writing on paper. In other aspects, the pen may be a stylus with the user writing on the surface of a computer display. Any interaction may be provided back to the system with knowledge of the encoded watermark on the document or supporting the document displayed on the computer screen. By repeatedly capturing the location of the camera, the system can track movement of the stylus being controlled by the user.

Figures 4A, 4B:
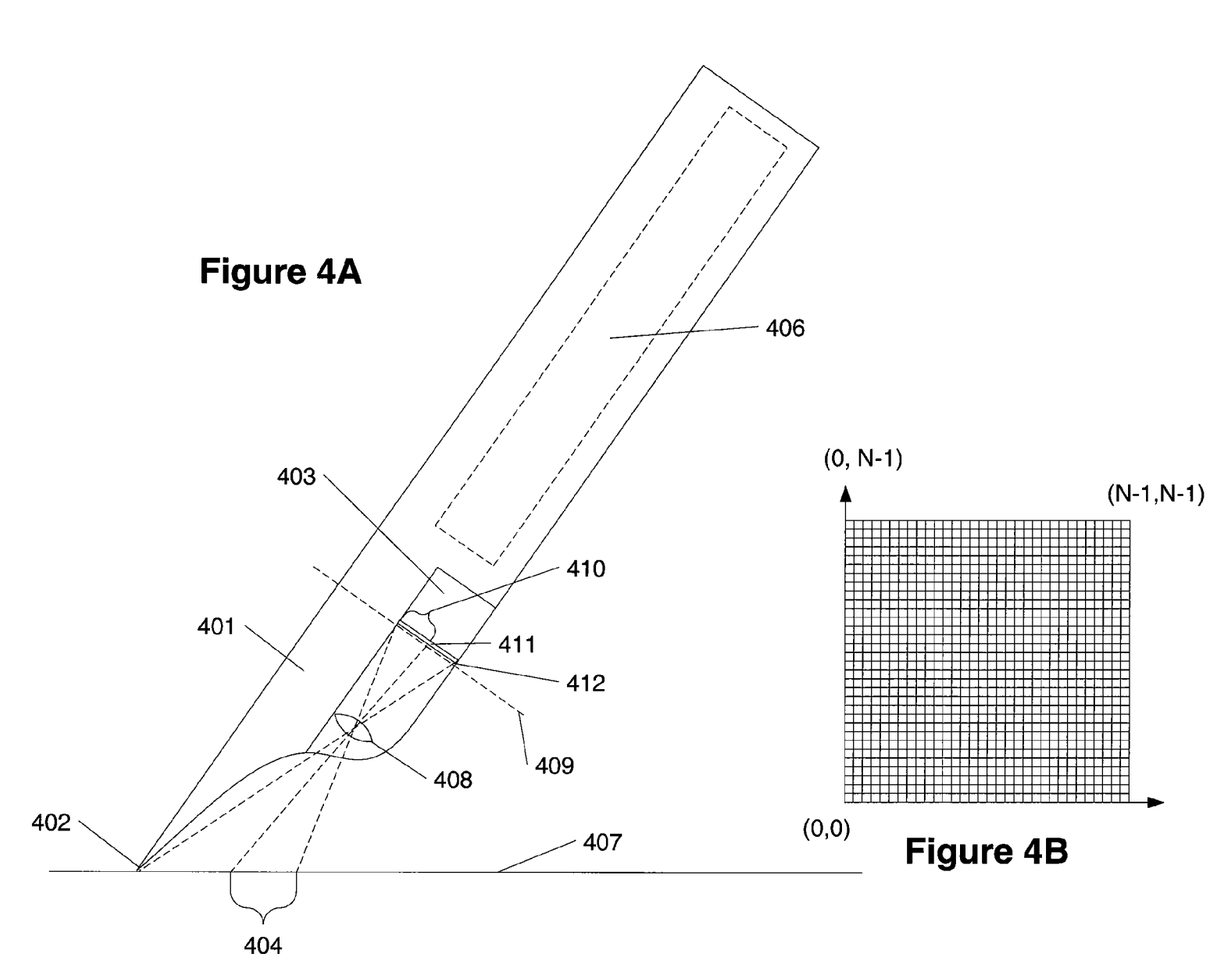
FIG. 4 showed a possible view of a pen and image capture system in accordance with embodiments of the present invention.

FIGS. 4A and 4B show an illustrative example of pen 401 with a camera 403. Pen 401 includes a tip 402 that may or may not include an ink reservoir. Camera 403 captures an image 404 from surface 407. Pen 401 may further include additional sensors and/or processors as represented in broken box 406. These sensors and/or processors 406 may also include the ability to transmit information to another pen 401 and/or a personal computer (for example, via Bluetooth or other wireless protocols).

FIG. 4B represents an image as viewed by camera 403. In one illustrative example, the field of view of camera 403 is 32×32 pixels (where N=32). Accordingly, FIG. 4B shows a field of view of 32 pixels long by 32 pixels wide. The size of N is adjustable based on the degree of image resolution desired. Also, while the field of view of the camera 403 is shown as a square for illustrative purposes here, the field of view may include other shapes as is known in the art.

The input to the pen 401 from the camera 403 may be defined as a sequence of image frames $\{I_i\}$, i=1, 2, ..., A, where Ii is captured by the pen 401 at sampling time ti. The sampling rate may be fixed or may be variable based on the size of the document. The size of the captured image frame may be large or small, depending on the size of the document and the degree of exactness required. Also, the camera image size may be determined based on the size of the document to be searched.

The image captured by camera 403 may be used directly by the processing system or may undergo pre-filtering. This pre-filtering may occur in pen 401 or may occur outside of pen 401 (for example, in a personal computer).

The image size of FIG. 4B is 32×32 pixels. If each encoding unit size is 3×3 pixels, then the number of captured encoded units would be approximately 100 units. If the encoding unit size is 5×5, then the number of captured encoded units is approximately 36.

The output of camera 403 may be compared with encoded information in the codebook. The codebook may be created from a color, grayscale, or black and white scan of an image. Alternatively, the codebook may be generated from an image output by an application or a received image. The output of the comparison of the codebook with sequence $\{I_i\}$ may be represented as a sequence $\{P_i\}$, i=1, 2, ..., A, where Pi represents all possible position candidates of pen tip 402 in document bitmap at sampling time ti.

FIG. 4A also shows the image plane 409 on which an image 410 of the pattern from location 404 is formed. Light received from the pattern on the object plane 407 is focused by lens 408. Lens 408 may be a single lens or a multi-part lens system, but is represented here as a single lens for simplicity. Image capturing sensor 411 captures the image 410.

The image sensor 411 may be large enough to capture the image 410. Alternatively, the image sensor 411 may be large enough to capture an image of the pen tip 402 at location 412. For reference, the image at location 412 is referred to as the virtual pen tip. It is noted that the virtual pen tip location with respect to image sensor 411 is fixed because of the constant relationship between the pen tip, the lens 408, and the image sensor 411. Because the transformation from the location of the virtual pen tip 412 (represented by $L_{virtual-pentip}$) to the location of the real pen tip 402 (represented by $L_{pentip}$), one can determine the location of the real pen tip in relation to a captured image 410.

The following transformation $F_{S \rightarrow P}$ transforms the image captured by camera to the real image on the paper:

$$L_{paper} = F_{S \rightarrow P}(L_{Sensor})$$

During writing, the pen tip and the paper are on the same plane. Accordingly, the transformation from the virtual pen tip to the real pen tip is also $F_{S \rightarrow P}$:

$$L_{pentip} = F_{S \rightarrow P}(L_{virtual-pentip})$$

The transformation $F_{S \rightarrow P}$ may be referred to as a perspective transformation. This simplifies as:

$$F'_{S \rightarrow P} = \begin{Bmatrix} s_x \cos\theta, & s_y \sin\theta, & 0 \\ -s_x \sin\theta, & s_y \cos\theta, & 0 \\ 0, & 0, & 1 \end{Bmatrix}$$

as the estimation of $F_{S \rightarrow P}$, in which $\theta$, $s_x$, and $s_y$ are the rotation and scale of two orientations of the pattern captured at location 404. Further, one can refine $F'_{S \rightarrow P}$ to $F_{S \rightarrow P}$ by matching the captured image with the corresponding background image on paper. Further, one can refine $F'_{S \rightarrow P}$ to $F_{S \rightarrow P}$ by matching the captured image with the corresponding background image on paper. "Refine" means to get a more precise perspective matrix $F_{S \rightarrow P}$ (8 parameters) by a kind of optimization algorithm referred to as a recursive method.

The recursive method treats the matrix $F'_{S \to P}$ as the initial value. $F_{S \to P}$ describes the transformation between S and P more precisely than $F'_{S \to P}$.

Next, one can determine the location of virtual pen tip by calibration.

One places the pen tip 402 on a known location $L_{pentip}$ on paper. Next, one tilts the pen, allowing the camera 403 to capture a series of images with different pen poses. For each image captured, one may receive the transform $F_{S \to P}$. From this transform, one can obtain the location of the virtual image of pen tip $L_{virtual-pentip}$:

$$L_{virtual-pentip} = F_{P \to S}(L_{pentip})$$

And, $$F_{P \to S} = 1/F_{S \to P}$$

By averaging the $L_{virtual-pentip}$ received from every image, an accurate location of the virtual pen tip $L_{virtual-pentip}$ may be determined.

The location of the virtual pen tip $L_{virtual-pentip}$ is now known. One can also obtain the transformation $F_{S \to P}$ from image captured. Finally, one can use this information to determine the location of the real pen tip $L_{pentip}$:

$$L_{pentip} = F_{S \to P}(L_{virtual-pentip})$$

Encoding

The image to be encoded may come from a scanner scanning a document. Alternatively, the image to be encoded may be in a fixed, electronic form (for example, an electronic file with a fixed display size with only read-only privileges). While the document may indeed be modifiable, for locating a position of a camera, the version encoded may generally correspond to the document viewed by camera 403. Otherwise, correlation may still occur but the codebook may not be as accurate as with a similarity between the scanned document and the images from the camera.

The image is parsed into sub-images. Each sub-image is encoded into an easily searchable form. The sub-images may be set to the same size as the output from camera 403. This provides the benefit of roughly equal search comparisons between the output from camera 403 and the information stored in the codebook. Subsequent processing may be performed on the resulting location to locate annotations on the input image and/or control other operations of a computing system based in the scanned image.

The following presents a number of different coding options, which may be used to generate a codebook. The image captured from the camera while using pen 401 may also be encoded using one of the following encoding methods so as to facilitate comparison of the information in the codebook and the encoded information from the camera. A variety of encoding systems are possible. Three are provided here; however, other encoding techniques may be used.

Simple Coding

Figure 5:
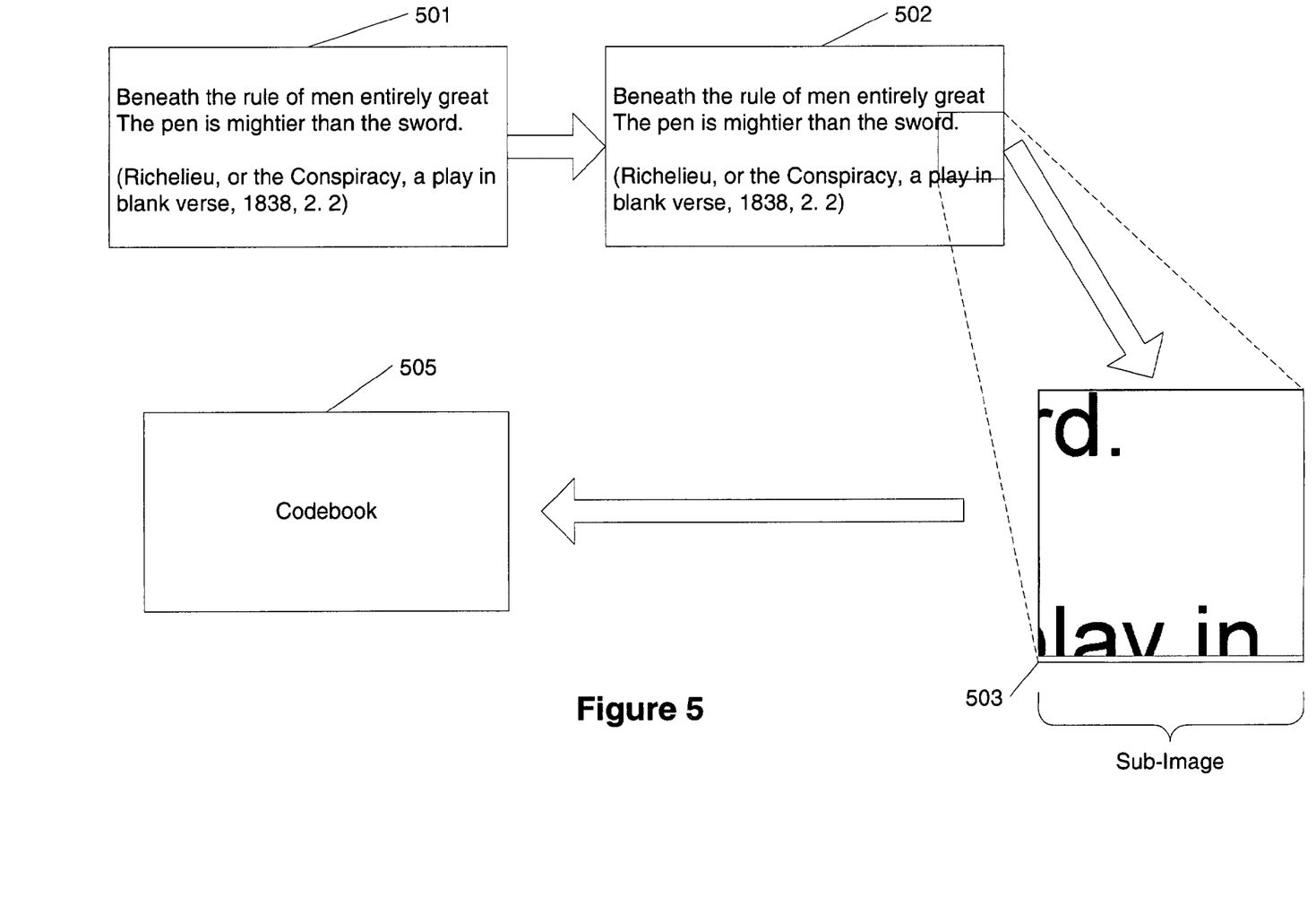
FIG. 5 shows a first process for encoding an image in accordance with embodiments of the present invention.

A first type of coding includes using the parsed sub-images from a received image themselves to act as the code. FIG. 5 shows an example of this process. An input image 501 is parsed into sub-images in step 502. The sub-images (represented by 503) are associated with their locations in the image 501 and stored in codebook 505. When searching the codebook 505, an image from the camera 403 is compared with one or more stored sub-images in codebook 505. One or more candidates may be provided from the comparison. Further, the location of the pen tip 402 may be determined.

Reduced Size Coding

Figure 6:
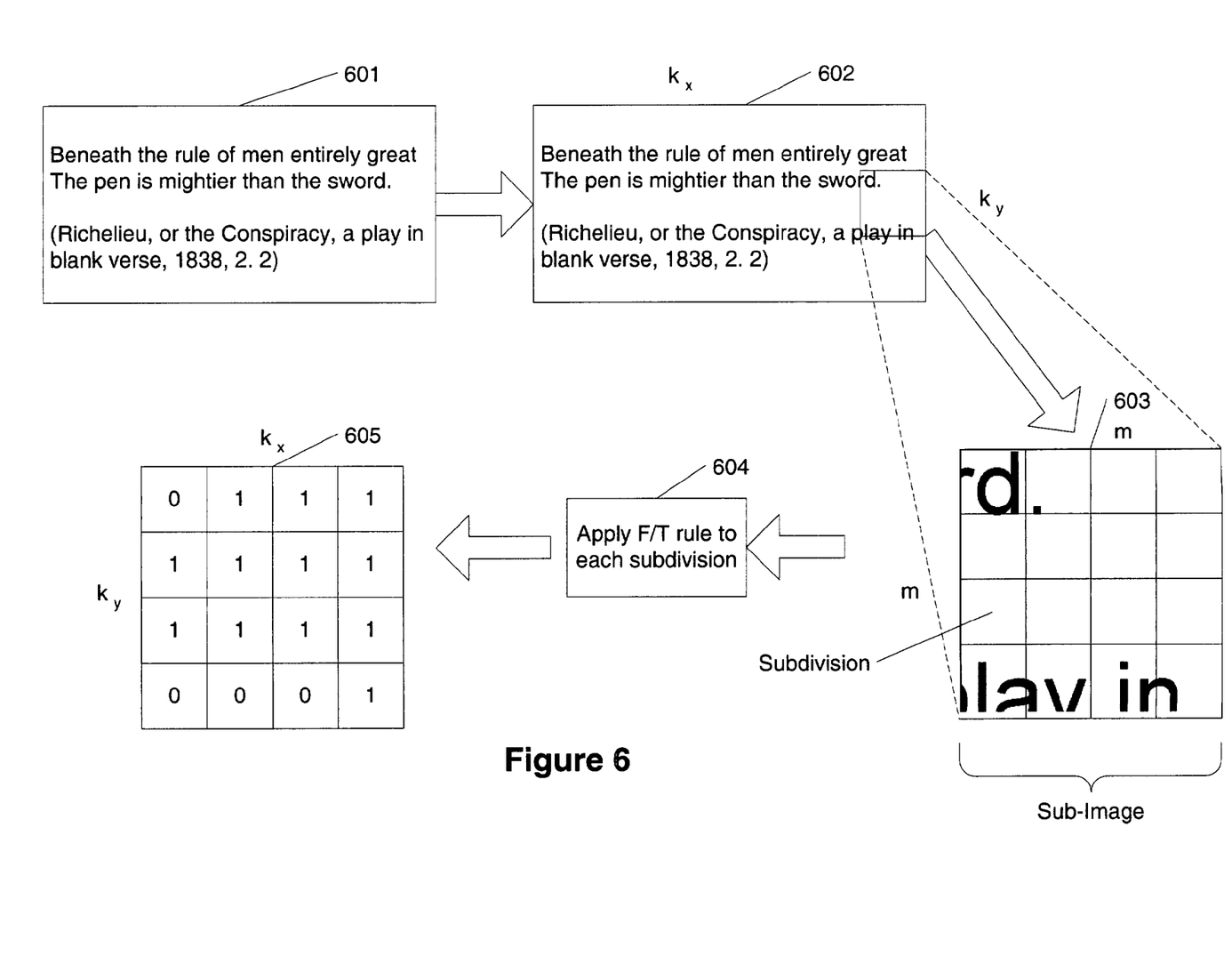
FIG. 6 shows a second process for encoding an image in accordance with embodiments of the present invention.

Another encoding example includes reducing the size of each sub-image. First, image 601 is received. Image 601 may be represented as image block I. Image block I, in some cases, may be converted into a binary image $I_b$ by applying a threshold to image block I. Next, the sub-images shown from 602 may be represented generically by $K_x * K_y$, with each sub-image being of size m*m. In the example of FIG. 6, m=4. In another example, m=32 where the sub-image is separated into a 32*32 grid, similar to the grid in FIG. 4B.

Further, the subdivisions m of each sub-image do not need to directly correspond to the image resolution of a camera. For example, the subdivisions m may be combinations or partial combinations of smaller subdivisions. Here, if the smaller subdivisions number 32, and m=4 (from FIG. 6), each subdivision m may contain 8 pixels.

Next, a rule-based analysis or threshold 604 (e.g., a true/false test) of the content of the subdivisions may be applied. An example of a threshold or rule to be applied to each subdivision in sub-image 603 may include a determination whether there are three contiguous white columns in each subdivision. Of course, other rule-based analyses may be used in place of or in conjunction with this example.

Based on the outcome of this analysis 604, a matrix 605 may be generated. Matrix 605 shows an example of the outcome of threshold 604 as applied to each subdivision in sub-image 603. The K matrix ($K_x$ wide by $K_y$ tall) has values 0/1 where 1 means true and 0 means false. The resulting K matrix may be expressed as $C_I^{k-win}$ of image block I, where k-win is another way of referring to the present coding method. $C_I^{k-win}$ may be represented as equation 1 with an example of a sub-image map as matrix 605.

$$C_I^{k-win} = \begin{bmatrix} c_{11} & \cdots & c_{1K} \\ \vdots & \ddots & \vdots \\ c_{KI} & \cdots & c_{KK} \end{bmatrix} \quad (1)$$

This type of coding may be searched by determining the distance between a first matrix and a matrix formed from an image from camera 403. The distance between two matrixes is the hamming distance of two matrixes as represented by equation 2.

$$\text{Dist}^{ham}(C_1, C_2) = \text{Ham}(C_1, C_2) \quad (2)$$

where Ham (a, b) is the hamming distance between matrix a and matrix b.

Radial Coding

Figure 7:
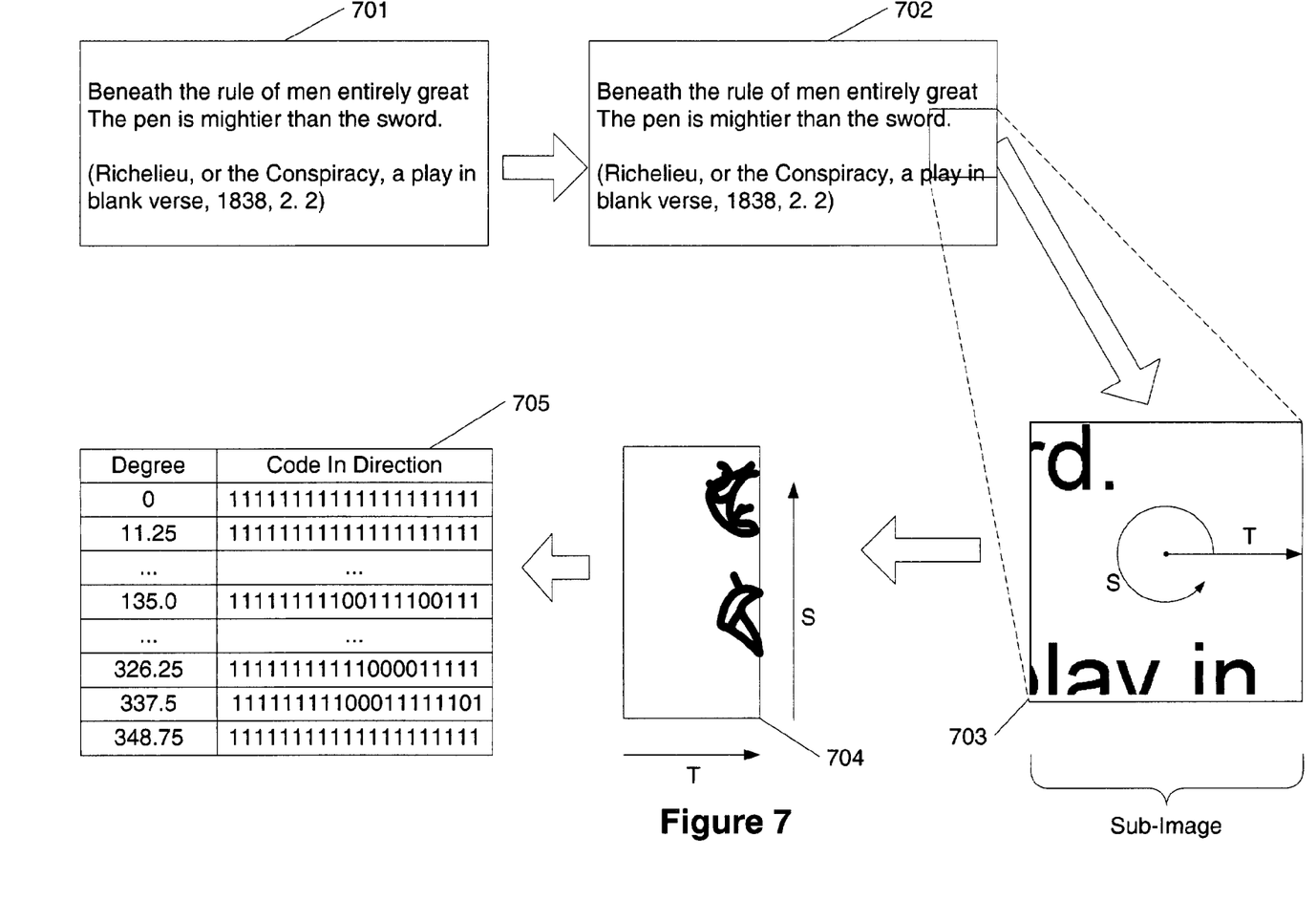
FIG. 7 shows a third process for encoding an image in accordance with embodiments of the present invention.

Another type of coding, referred to as radial coding, is described with respect FIG. 7. An image 701 is received and parsed into sub-images in step 702. In 703, the sub-image is sampled by rotating vector T about center of the sub-image in direction S. The encountered information in the sub-image of 703 is represented by unwrapped image 704. In other words, the sub-image block of 703 is sampled in polar coordinates.

The center pixel (or region) of the sub-image in 703 is treated as the origin, the sampling angle is S, and the magnitude of the sampling vector is T. For a 32 by 32 pixel region, S=32 and T=16.

For each sampling point (t, s), t=0, 1, ..., T−1, s=0, 1, ..., S−1, its position in Cartesian coordinate is ($x_{t,s}$, $y_{t,s}$), where $x_{t,s}$ and $y_{t,s}$ are represented by Equations 3 and 4, respectively.

$$x_{t,s} = t\frac{N}{2T}\cos\left(s \cdot \frac{2\pi}{S}\right) \quad (3)$$

$$y_{t,s} = t\frac{N}{2T}\sin\left(s \cdot \frac{2\pi}{S}\right) \quad (4)$$

The gray level value of point (t, s) is represented by equation 5, $$G_{t,s} = F(x_{t,s}, y_{t,s}), \quad (5)$$

where F is a 2-D Gaussian filter represented by equation 6.

$$F(x, y) = \frac{\sum_{i=-q}^{q}\sum_{j=-q}^{q} e^{\frac{-(([x]+i-x)^2+([y]+j-y)^2)}{\sigma^2}} P([x]+i, [y]+j)}{\sum_{i=-q}^{q}\sum_{j=-q}^{q} e^{\frac{-(([x]+i-x)^2+([y]+j-y)^2)}{\sigma^2}}}, \quad (6)$$

where P(x, y) means the gray level value of the pixel in position (x, y); the brackets "[ ]" means the nearest integers of a real value; σ and q are the filter parameters. Examples of the filter parameters may include σ=1.15, q=1. The values are determined by empirically testing the algorithms to determine which values work best for a given environment.

As polar coordinates are used to analyze the sub-image block as shown in 703, the resulting analysis has a higher degree of robustness in handling rotation differences between the camera frame and the sub-images. The rotation of camera image to be compared with the information in the codebook is not a complex issue as rotation of the captured camera image translates to shifting of the image in 704.

The image in 704 may be converted to its binary representation for each angle S across vector T as shown in table 705. The degree is the value 2π·s/S as s ranges from 0 to S−1. The image or sub-images (701, 702, 703, 704) may be converted at a number of locations to a binary (black and white) image, if not previously converted to binary image when initially scanned, received or captured.

The grey level value matrix $\{G_{t,s}\}$ (where t=0, 1, ..., T−1, s=0, 1, ..., S−1) may be converted to a binary matrix $C_I^{rad}$ (as shown in equation 7) by applying a threshold to the values in the grey level matrix.

$$C_I^{rad} = \begin{bmatrix} c_{11} & \cdots & c_{1T} \\ \vdots & \ddots & \vdots \\ c_{SI} & \cdots & c_{ST} \end{bmatrix} \quad (7)$$

This code may then be compiled into a codebook with information relating to the location of the sub-images in the larger image.

To determine the location of a camera image with the different codes in the codebook, one may determine the distance between the camera image and the other code representations. The smallest distance or set of smallest distances to candidates may represent the best choice of the various locations. This distance may be computed by the hamming distance between the camera image and the current sub-images.

As set forth above, the distance from the captured image from the camera may be compared with one or more the code segments from the codebook. At least two types of distance may be used for the radial code: common hamming distance and rotation-invariant distance. Other distance determinations may be used.

The common hamming distance may be used as represented in equation 8 to determine the distance between a codebook code and a code associated with a camera image.

$$\text{Dist}^{ham}(C_1, C_2) = \text{Ham}(C_1, C_2). \quad (8)$$

Another type of distance that may be used includes a rotation-invariant distance. The benefit of using a rotation invariant distance is that the rotation of the camera is addressed as shown in equation 9.

$$\text{Dist}^{r-i}(C_1, C_2) = \min_{d=0,\cdots,S-1}(\text{Ham}(C_1, \text{Rot}(C_2, d))) \quad (9)$$

where $\text{Rot}(C_1^{rad}, d)$ is defined as set forth in equation 10.

$$\text{Rot}(C_I^{rad}, d) = \begin{bmatrix} c_{d+1,1} & \cdots & c_{d+1,T} \\ \vdots & \ddots & \vdots \\ c_{S,1} & \cdots & c_{S,T} \\ c_{1,1} & \cdots & c_{1,T} \\ \vdots & \ddots & \vdots \\ c_{d,1} & \cdots & c_{d,T} \end{bmatrix} \quad (10)$$

Codebook Generation

The codebook stores the codes relating to sub-images taken from an image and associated with their locations in the image. The codebook may be created before capturing images with camera 403. Alternatively, the codebook may be created or at least augmented during use. For example, the camera may pick up images during operation. If the user only writes on existing information as shown in FIGS. 501, 601, and 701, then the codebook may be used as presently described to determine the location of the image captured by the camera. However if the user writes over new annotations, the codebook will not be as correct as it could be. Accordingly, when new annotations are added by pen 401, these annotations may be incorporated back into the codebook so future annotations will be more accurately correlated with their on-screen representation.

Codebook generation may be as follows. The sub-images shown in 503, 603, and 703 are encoded by an encoding method. Next, the position-code pairs are organized to create the codebook. At least two types of organization methods may be used to create the codebook. Of course other methods may be used to create the codebook as well. These two methods are given as illustrative examples only.

The first method is to place the position-code pairs into a linear list in which each node contains a code and a position sequence where all positions are mapped to the code. The code book then may be represented as equation 11:

$$\Omega = \{\psi_i, i=1,2,\ldots,N_\Omega\} \quad (11)$$

where ψ is defined as $\psi = \{C_\psi, P_\psi\}$, $P_\psi$ is the set of all positions in the document bitmap where its code is C is shown in equation 12:

$$P_\psi = \{p_i | \text{the code at position pi is } C_\psi, i=1,2\ldots\}. \quad (12)$$

Next, the set $\Omega$ may be sorted by the code of each member $\psi$ alphabetically, and then the codebook of the linear list type is obtained.

The second method is to place the codes with their corresponding locations into a binary tree.

Figure 8:
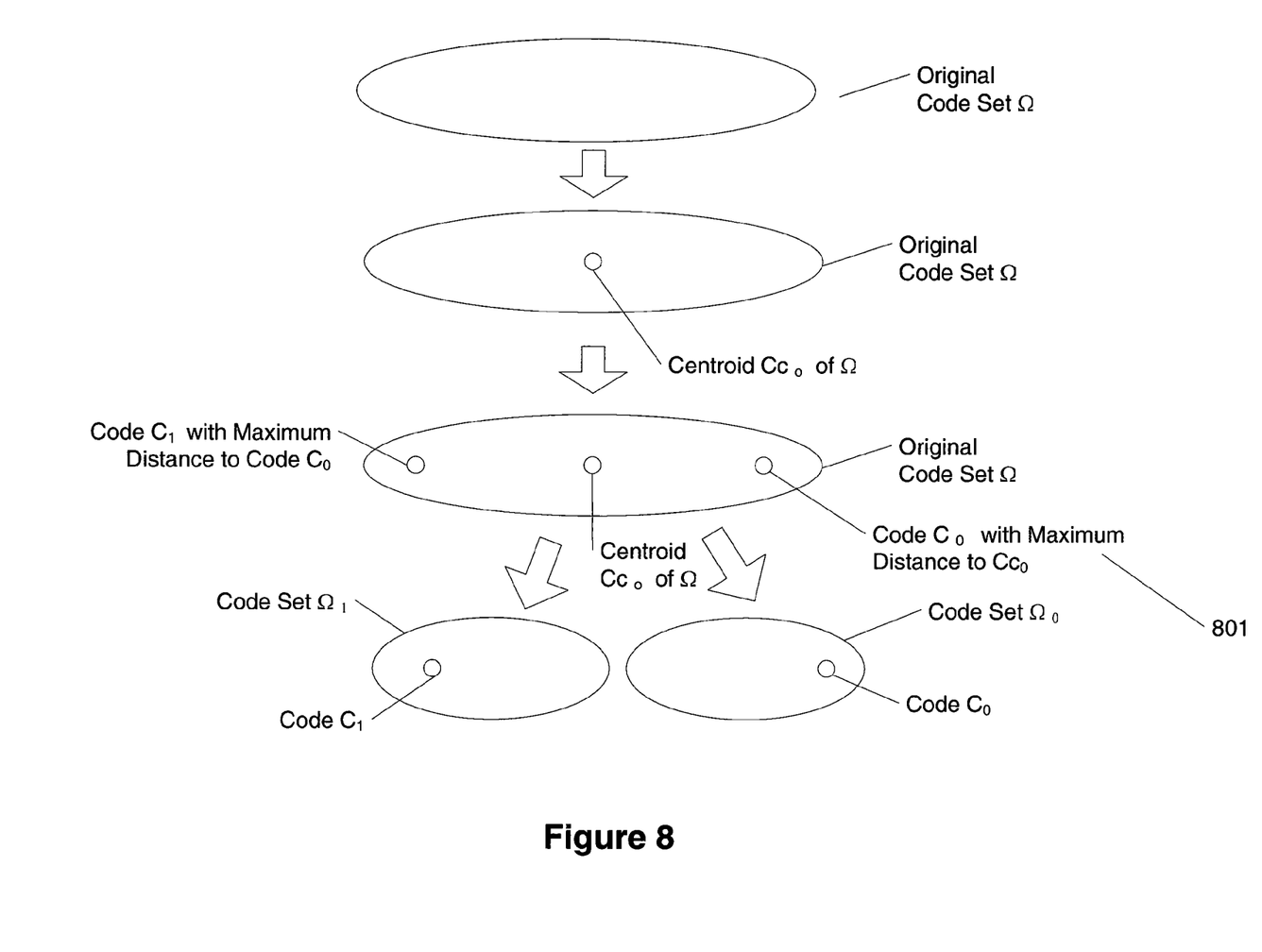
FIG. 8 shows an illustration of the construction of a codebook in accordance with embodiments of the present invention.

The binary tree may be based on the Hamming distance between codes as represented by FIG. 8. First, the centroid $Cc_0$ of the total code set $\Omega$ is found. Next, the code $C_0$ with the maximum hamming distance to the centroid $Cc_0$ is found. Next, the code $C_1$ with the maximum distance to code $C_0$ is found.

The code set C is then split into two subsets: $\Omega_0$ and $\Omega_1$. The contents of $\Omega_0$ may be represented by equation 12 and the contents of $\Omega_1$ represented by equation 13.

$$\Omega_0 = \{\psi_i | \text{Dist}(C_{\psi_i}, C_0) < \text{Dist}(C_{\psi_i}, C_1)\} \quad (12)$$

$$\Omega_1 = \{\psi_i | \psi_i \notin \Omega_0\} \quad (13)$$

Next, for subsets $\Omega_0$ and $\Omega_1$, the steps of founding the centroid, finding the code with the maximum distance to the centroid, finding the code with the maximum distance to the code farthest away from the centroid, then splitting the subset is repeated until the number of members of the subset is 1.

Candidate Search

The position candidates for a captured frame from the camera may be determined by searching the codebook. For each camera captured frame Ii, the candidate positions of the pen tip 402 may be determined as follows:

1) The frame Ii from the camera is encoded with the same encoding method used to generate the codebook;
2) The encoded frame $E_{Ii}$ is compared with the information in the codebook. The distance between the encoded frame $E_{Ii}$ and the encoded information in the codebook is determined. The encoded information in the codebook with the smallest distance to the encoded frame $E_{Ii}$ is used as the position candidate or one of the position candidates. Of these candidates, the best match is chosen.

The choice for best candidates may include a number of different analyses. First, the candidate most closely matching (minimum distance to code $E_{Ii}$) may be selected. Alternatively, the most recent set of candidates may be compared with the a recent sequence of candidates and compare the frames over time. The resultant comparison should result in a series of position locations that are closest to each other. This result is expected as it indicates that the pen tip moved as little as possible over time. The alternative result may indicate that the pen tip jumped around the page in a very short time (which is less probable).

For searching the codebook, the following may be used. For each captured image I, with code $C_1$, the best matched code set $S(C_1)$ is defined as equation 14.

$$S(C_1) = \{\psi_i | \text{Dist}(C_1, C_{\psi_i}) < d_{thresh}, \psi_i \in \Omega, i=1, \ldots, N_s\}, \quad (14)$$

if the radial code is used, the distance function should be $\text{Dist}^{r-i}(\bullet, \bullet)$.

Only $N_{thresh}$ codes with less distance in $S(C_1)$ are kept, if $N_s > N_{thresh}$, $d_{thresh}$ and $N_{thresh}$ are selected based on the camera performance.

The set of position candidates for image I may be represented by equation (15).

$$P_I = \bigcup_{i=1}^{N_I} P_{\psi_i}, \psi_i \in S(C_I) \quad (15)$$

Although the invention has been defined using the appended claims, these claims are illustrative in that the invention is intended to include the elements and steps described herein in any combination or sub combination. Accordingly, there are any number of alternative combinations for defining the invention, which incorporate one or more elements from the specification, including the description, claims, and drawings, in various combinations or sub combinations. It will be apparent to those skilled in the relevant technology, in light of the present specification, that alternate combinations of aspects of the invention, either alone or in combination with one or more elements or steps defined herein, may be utilized as modifications or alterations of the invention or as part of the invention. It may be intended that the written description of the invention contained herein covers all such modifications and alterations.

The invention claimed is:

1. A system for encoding an image of a document comprising:
   an input that receives said image of said document;
   a parser that parses said image into sub-images;
   a encoder that encodes said sub-images into a code;
   a storage that stores said code associated with a location of said sub-images in relation to said image,
   wherein said storage includes a codebook;
   wherein said storage stores said codes into a binary tree,
   wherein said binary tree separates said codes based on their distance from a centroid of said codebook.

2. The system for encoding according to claim 1, wherein said encoder encodes based on sections of said sub-images.

3. The system for encoding according to claim 1, wherein said encoder encodes based on radial analysis of said sub-images.

4. A system for creating a codebook comprising:
   an input that receives codes associated with sub-images of an image;
   a processor that organizes said codes into said codebook, said codes being associated with a location of said sub-images in relation to said image; and
   a storage that stores said code book,
   wherein said processor organizes said codes into a binary tree,
   wherein said binary tree separates said codes based on their distance from a centroid of said codebook.

5. The system for creating a codebook according to claim 4, wherein said processor organizes said codes into a linear list of said codes.

6. The system for creating a codebook according to claim 4, wherein said binary tree further separates said codes based on their distance from centroids of subsections of said codebook.

7. A system for searching a codebook comprising:
   a first input that receives a codebook having codes associated with sub-images of an image and information relating to the location of the sub-images in said image;
   a second input that receives an image from camera attached to a pen;
   an encoder that encodes said image from said camera and output a code associated with said camera image;

a processor that searches said codebook for one or more code candidates that are similar to said code associated with said camera image;

an output that outputs one or more locations associated with said one or code candidates, wherein said processor organizes said codes in the codebook into a binary tree, wherein said binary tree separates said codes in the codebook based on their distance from a centroid of said codebook.

8. A method for creating a codebook comprising the steps of:

receiving encoded information regarding a sub-image;

receiving location information regarding where said sub-image is located in a larger image;

associating said encoded information with said location information;

storing said associated information as said codebook;

finding a centroid of said encoded information;

finding a first code of said encoded information farthest from said cetroid;

finding a second code of said encoded information farthest from said first code; and separating said encoded information to two datasets, with one closer to said first code and the other closer to said second code.

9. The method according to claim 8, wherein said storing step further comprises storing said codebook as a linear list.

10. The method according to claim 8, wherein said storing step further comprises storing said codebook as a binary tree.

11. The method according to claim 10, further comprising the step of reducing the size of said encoded information for storage in said binary tree.

12. The method according to claim 8, wherein repeating the steps of finding a centroid through separating said encoded information until a binary is realized.

* * * * *